(12) United States Patent
Repin et al.

(10) Patent No.: US 8,462,153 B2
(45) Date of Patent: Jun. 11, 2013

(54) PRESENTING TEXTUAL AND GRAPHIC INFORMATION TO ANNOTATE OBJECTS DISPLAYED BY 3D VISUALIZATION SOFTWARE

(75) Inventors: Dmitriy Repin, Katy, TX (US); Vivek Singh, Houston, TX (US); Farid Harhad, Baton Rouge, LA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 926 days.

(21) Appl. No.: 12/429,812

(22) Filed: Apr. 24, 2009

(65) Prior Publication Data

US 2010/0271391 A1    Oct. 28, 2010

(51) Int. Cl.
*G06T 17/00*    (2006.01)
*G09G 5/00*    (2006.01)

(52) U.S. Cl.
USPC .......................................... 345/420; 345/635

(58) Field of Classification Search
USPC ....................................................... 345/420
See application file for complete search history.

(56) References Cited

U.S. PATENT DOCUMENTS

| | | | |
|---|---|---|---|
| 5,577,188 A * | 11/1996 | Zhu ............................... | 715/745 |
| 7,305,611 B2 * | 12/2007 | Coppin et al. ................ | 715/201 |
| 2002/0054129 A1 | 5/2002 | Heron et al. | |
| 2003/0122924 A1 * | 7/2003 | Meyers ....................... | 348/14.11 |
| 2005/0116964 A1 * | 6/2005 | Kotake et al. ................ | 345/629 |
| 2007/0061704 A1 * | 3/2007 | Simova et al. ............... | 715/512 |
| 2008/0198159 A1 * | 8/2008 | Liu et al. ...................... | 345/420 |

OTHER PUBLICATIONS

Examination Report of Canadian Application No. 2,693,585 dated May 29, 2012: pp. 1-4.

* cited by examiner

*Primary Examiner* — Ryan R Yang
(74) *Attorney, Agent, or Firm* — Colin Wier

(57) ABSTRACT

The present invention relates to a method of displaying a dynamic 2D annotation associated with an object displayed in a 3D scene. The method includes providing a computer system that includes a display device; establishing a view location and direction; orienting the dynamic 2D annotation substantially perpendicular to the view direction; orienting the dynamic 2D annotation substantially horizontal relative to the 3D scene; positioning the dynamic 2D annotation relative to an attachment point on or near the object; extending an attachment handle between the dynamic 2D annotation and the attachment point; and displaying the dynamic 2D annotation and the attachment handle in the 3D scene on the display device.

18 Claims, 6 Drawing Sheets

FIG. 5

Form1
File  View

Drilling Motor
Status: Drilling
Rotation: 82 rmp
WARNING: OUT OF SAFE RANGE
Diameter: 8.25"
Inspected: 04/01/2010
Company: Schlumberger Rotary Drill Bit
Diameter: 8.5"
Length: 25'
Weight: 35 lb
Material: Titanium
Inspected: 04/01/2010
Company: Schlumberger
Price: $1,000,000

PRESENTING TEXTUAL AND GRAPHIC INFORMATION TO ANNOTATE OBJECTS DISPLAYED BY 3D VISUALIZATION SOFTWARE

BACKGROUND OF INVENTION

1. Field of the Invention

The present invention relates generally to animated displays and particularly to displaying text or graphics in a 3D animated display.

2. Background Art

Animated displays have long been used to provide visual representations of physical systems. Such displays have evolved from rather simple 2D hand-drawn renderings to highly realistic 3D computer graphics. High quality kinematic or dynamic 3D displays are commonly produced when simulating an operating physical device, depending on the sophistication of the software driving the simulation. The displays allow a user to "see" a scene that typically cannot be viewed directly. Such simulations or models are invaluable to a user who must make decisions based on his or her understanding of an actual physical situation.

Because the sophistication of modern display methods allow highly accurate depictions from various viewer perspectives and can convey large quantities of information associated with the various display elements, the management of that associated information can become an issue. For example, textual information associated with a particular display element may be legible when viewed from one perspective (see FIG. 1A), but becomes illegible or barely legible when the perspective is changed (see FIG. 1B). One way to address that problem is to dynamically reposition and reorient the annotation so as to be perpendicular to the view direction (see FIGS. 2A and 2B) However, that may cause the displayed annotation to obscure or overlap the desired display element when viewed from certain perspectives (see FIG. 3A), or the associated information may become dissociated from the particular display element if displaced so as to keep it from obscuring or overlapping the display element (see FIG. 3B).

SUMMARY

The present invention relates to a method of displaying a dynamic 2D annotation associated with an object displayed in a 3D scene. The method includes providing a computer system that includes a display device; establishing a view location and direction; orienting the dynamic 2D annotation substantially perpendicular to the view direction; orienting the dynamic 2D annotation substantially horizontal relative to the 3D scene; positioning the dynamic 2D annotation relative to an attachment point on or near the object; extending an attachment handle between the dynamic 2D annotation and the attachment point; and displaying the dynamic 2D annotation and the attachment handle in the 3D scene on the display device.

Other aspects and advantages of the invention will become apparent from the following description and the attached claims.

BRIEF DESCRIPTION OF THE FIGURES

FIG. 5 is a "screen shot" of an animated display, along with associated textual and graphical information, using a method in accordance with the present invention.

It is to be understood that the drawings are to be used for the purpose of illustration only, and not as a definition of the metes and bounds of the invention, the scope of which is to be determined only by the scope of the appended claims.

DETAILED DESCRIPTION

Specific embodiments of the invention will now be described with reference to the figures. Like elements in the various figures will be referenced with like numbers for consistency.

Figure 1A:
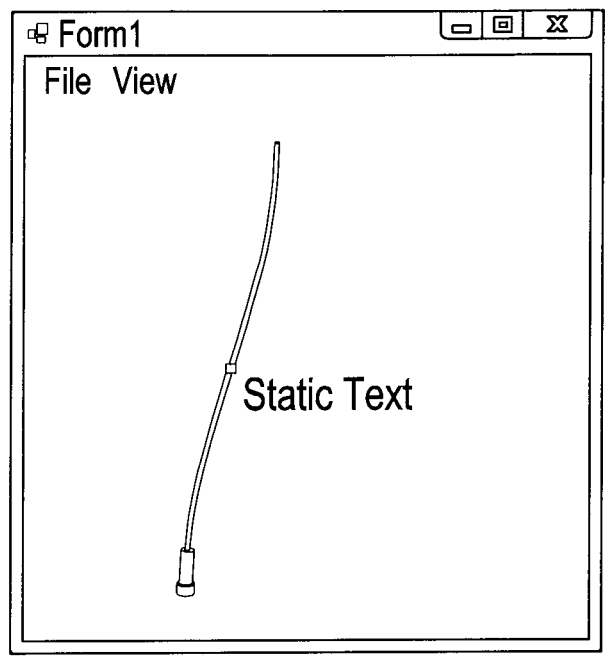
FIGS. 1A and 1B are "screen shots" of animated displays, along with associated textual information, using a prior art display method.
Figure 1B:
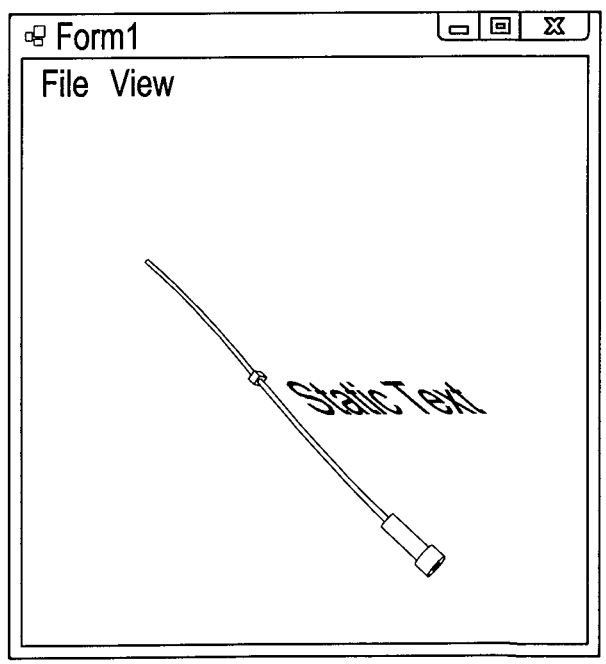
Figure 2A:
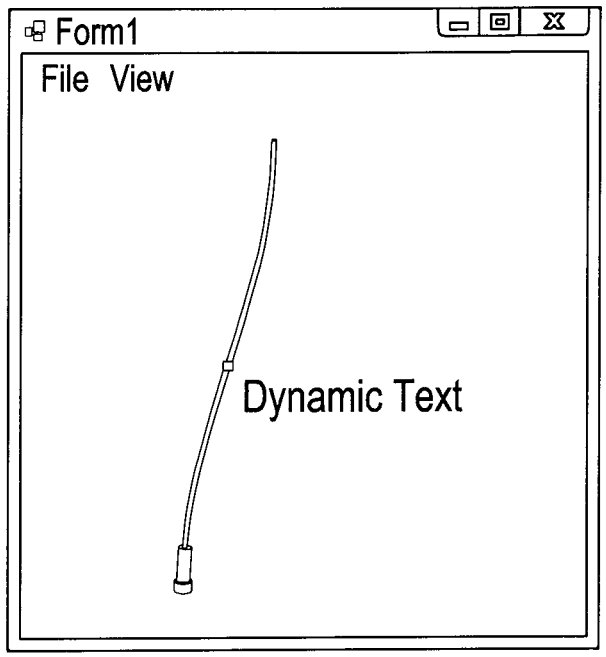
FIGS. 2A and 2B are "screen shots" of animated displays, along with associated textual information, using a prior art display method.
Figure 2B:
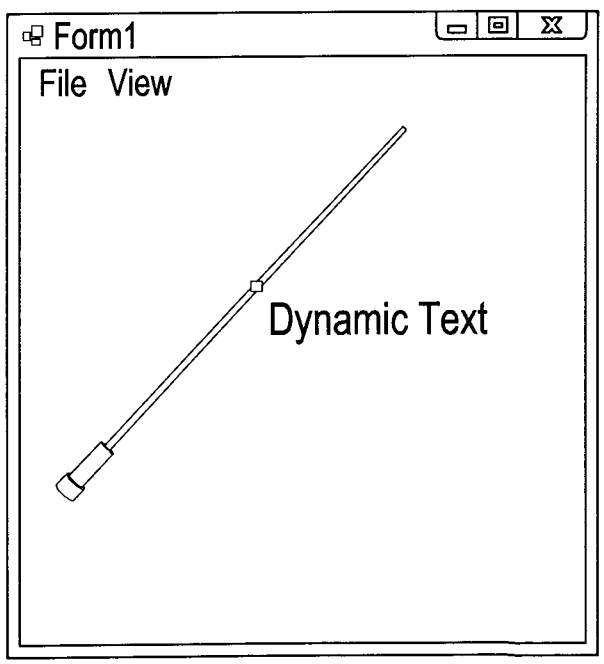
Figure 3A:
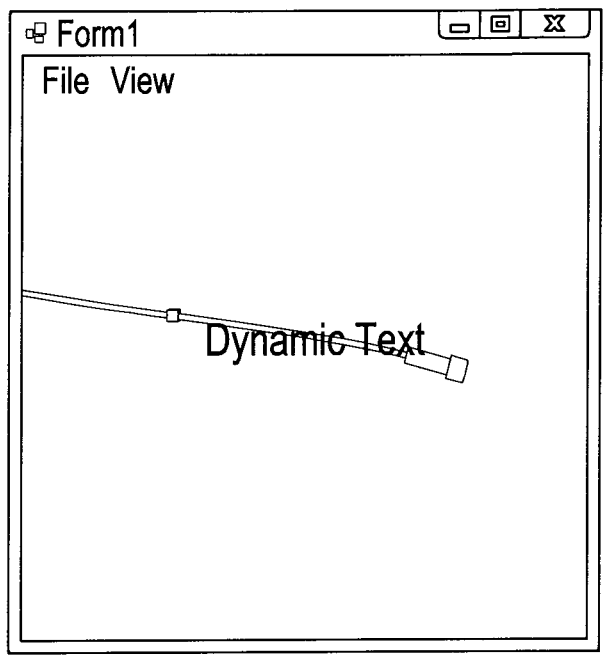
FIGS. 3A and 3B are "screen shots" of animated displays, along with associated textual information, using a prior art display method.
Figure 3B:
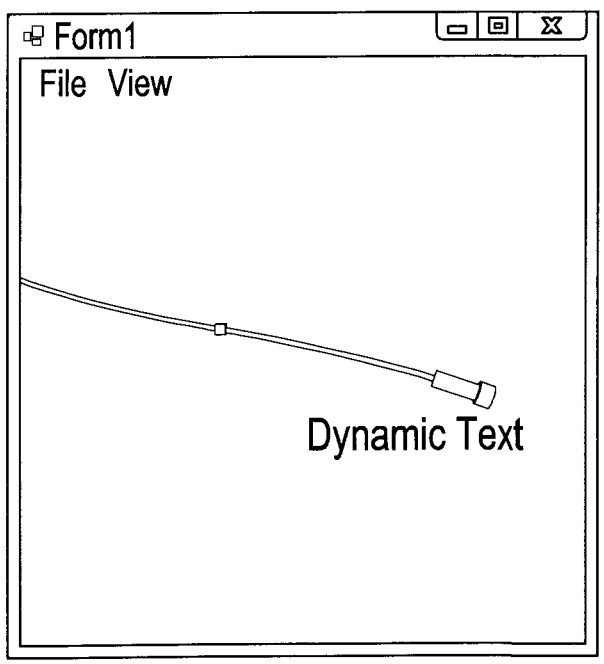
Figure 4:
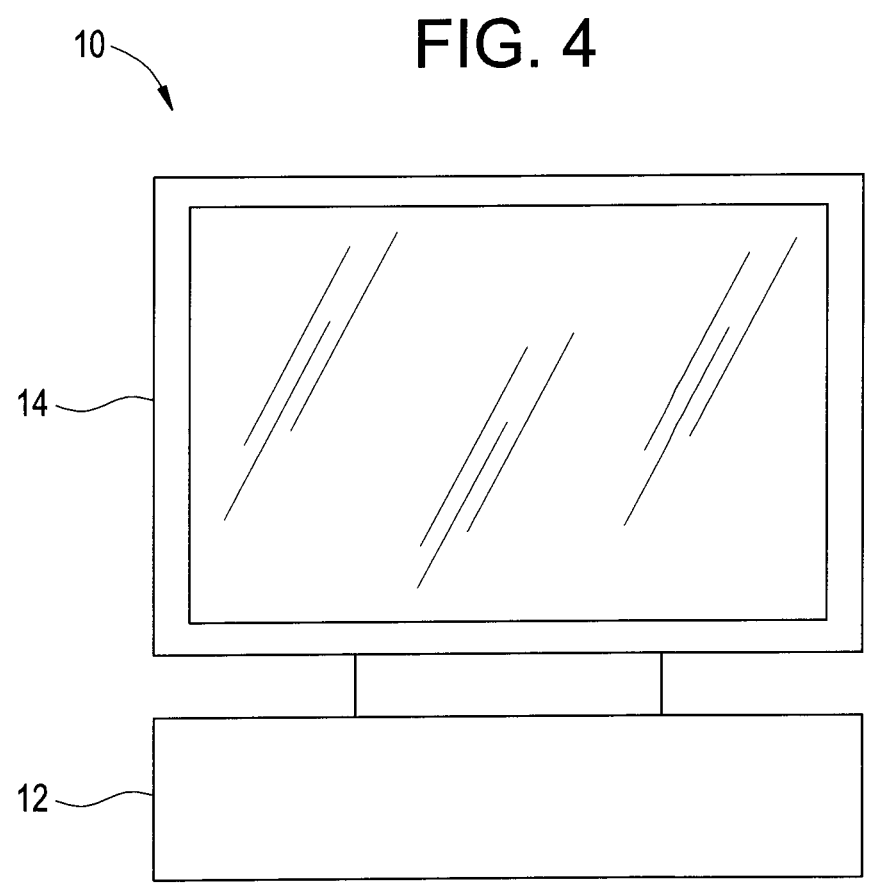
FIG. 4 is a schematic display of a basic computer system that may be used, using a method in accordance with the present invention.

A computer system typically includes a processing unit along with various peripheral devices such as one or more display devices. Display devices may include, for example, printers, plotters, and monitors. The display devices allows a user to see text or graphics generated by the processor in accordance with instructions given to the processor. FIG. 4 shows a schematic of a very basic computer system 10 having a processor 12 and a display device 14.

Modern Geology, Geophysics, Drilling, and Production (GGDP) applications employ a 3D canvas to show a 3D view of different GGDP-related objects. GGDP-related objects are very wide-ranging and may include, for example, earth layers and faults, drilling platforms and their locations, boreholes and their locations relative to a surface location or drilling platform, bottom-hole assemblies (BHAs) used to drill or make measurements in the boreholes, drilling events and risks encountered while drilling, and pipeline routes and their relative positions.

To assist a user in identifying the displayed objects and convey other information about the object, annotations are used. FIG. 5 shows a screen shot in which two annotations have been included in the displayed output. A first annotation 16 identifies one of the display objects as a drilling motor and provides information about the drilling motor. The second annotation 18 similarly identifies a display object as the rotary drill bit and provides related information.

The placement of the annotations 16, 18 in the display shown in FIG. 5 is controlled using a novel extension of a traditional 2D graphics technique used to annotate 2D drawings. The 2D graphics technique is known as a "callout". Callouts have been used, for example, to show dialogs in cartoons. A similar graphical technique is described herein to annotate objects in a 3D scene. In accordance with one embodiment, a 3D callout 20 is drawn as a flat polygon (usually a rectangle, but it can be any 2D shape) that contains an information area 22 and an attachment handle 24 that points to an annotated object 26 and terminates on or near a point on the display object referred to as the "attachment point". The information area 22 of the 3D callout 20 can contain single or multi-line text (including different fonts, colors, and hyperlinks), images, 2D and 3D animation, as well as static and dynamically-updated graphs, charts, and gauges. The 3D callout 20 is preferably dynamically oriented substantially perpendicular to the user's view direction and is preferably aligned horizontally in the 3D scene. That is, when the viewer position and view direction changes, the 3D callout 20 is preferably rotated around its attachment point to remain horizontal relative to the 3D scene and perpendicular to the view direction.

Figure 6:
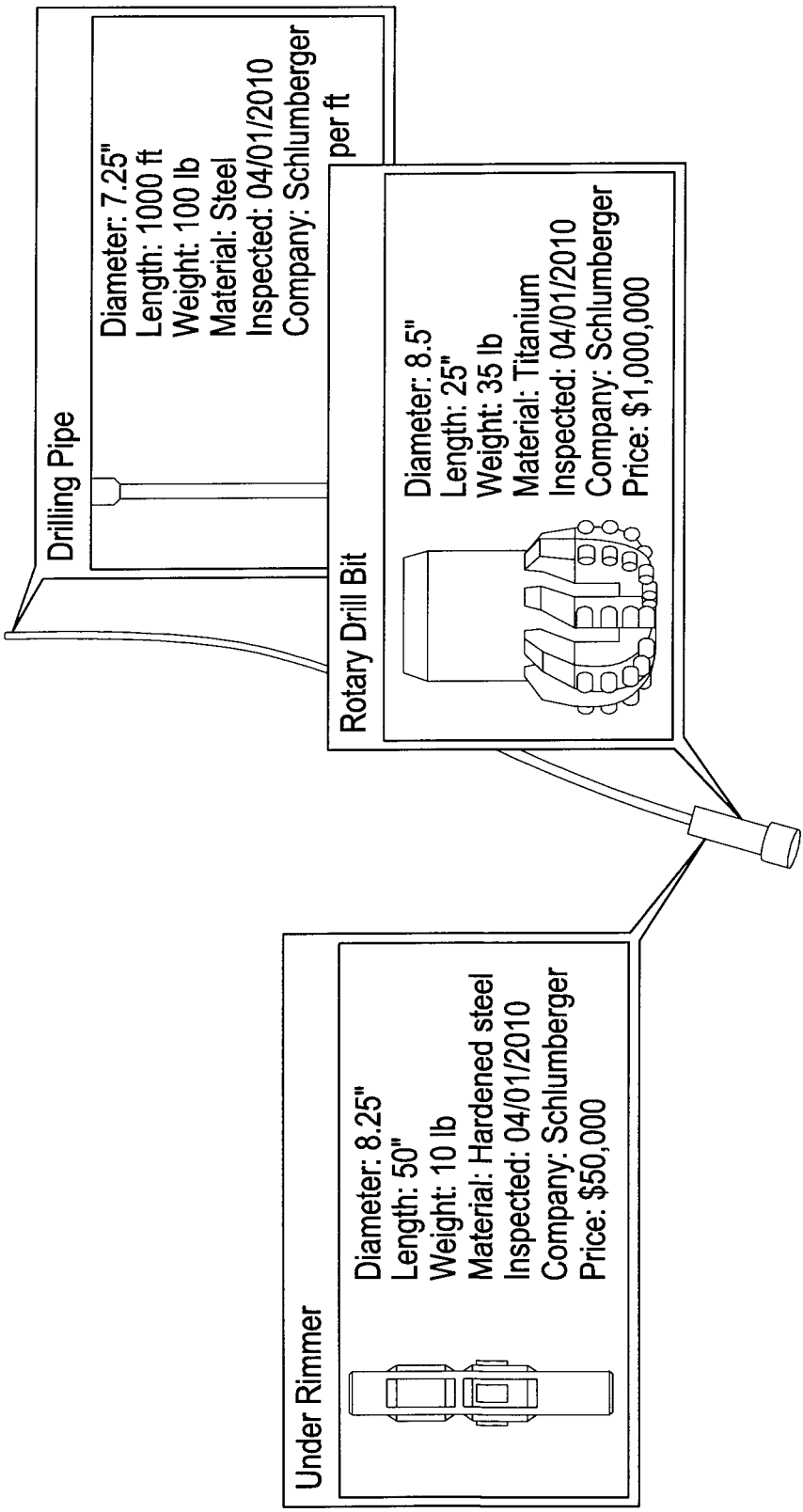
FIG. 6 is a "screen shot" of an animated display, along with associated textual and graphical information, using a method in accordance with the present invention.

3D callout 20 could have different placements relative to its attachment point. For example, 3D callout 20 can be positioned to the upper-left, the upper-right, the lower-left, or the lower-right of the annotated object, as shown in FIG. 6. The orientation and placement of the 3D callout can be either selected manually by the user or determined automatically by a program such that it does not obscure the annotated display object.

The 3D callout 20 can be treated as a regular object of the 3D scene, in which case its size depends on its distance from the viewer, or its size can be dynamically recalculated to keep its projection on the display to be of constant size. Such recalculation preferably occurs each time the viewer position or view direction changes and/or when the callout is re-oriented. Regardless of the size of the callout, its attachment handle is always attached to the attachment point. Normally, any 3D object that is positioned between the callout and the viewer can partially or completely obscure the callout. However, one can chose to change the rendering order of the 3D objects to draw the callout in front of any other object in the 3D scene. Combined with fixing the size of the callout in the display, such a technique would create an illusion of a 2D annotation "glued" on top of the 3D scene such that it would follow every scene move.

The callout position in the 3D scene does not have to be constant. For example, if the 3D scene is animated and the position of the annotated object and/or the attachment point changes with time, the callout position can also change to track the movement of the annotated object, making sure that the callout is still attached to the attachment point. For example, if the callout annotates the location of a drill bit within the wellbore, its position will change as the drill bit drills deeper and deeper into the earth.

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A method to display a dynamic 3D annotation associated with an object displayed in a 3D scene, comprising:
   providing a computer system that includes a display device;
   establishing a view location and direction;
   orienting the dynamic 3D annotation substantially perpendicular to the view direction;
   orienting the dynamic 3D annotation substantially horizontal relative to the 3D scene;
   positioning the dynamic 3D annotation relative to an attachment point on or near the object;
   extending an attachment handle between the dynamic 3D annotation and the attachment point;
   displaying the dynamic 3D annotation and the attachment handle in the 3D scene on the display device; and
   dynamically recalculating the size of the dynamic 3D annotation to keep its projection displayed by the display device constant as the view location changes.

2. The method of claim 1, wherein the dynamic 3D annotation includes an information area.

3. The method of claim 2, wherein the information area presents information in the form of text, images, animations, graphs, hyperlinks, and/or tables.

4. The method of claim 1, wherein the display device is a monitor, a printer, or a plotter.

5. The method of claim 1, further comprising positioning the dynamic 3D annotation to eliminate any overlap between the dynamic 3D annotation and the object.

6. The method of claim 5, further comprising positioning the dynamic 3D annotation to eliminate any overlap between the dynamic 3D annotation and other objects displayed in the 3D scene.

7. The method of claim 1, further comprising sizing the dynamic 3D annotation based on its distance from the viewing location.

8. The method of claim 1, further comprising ordering the rendering of the display objects to draw the dynamic 3D annotation on top.

9. The method of claim 1, wherein the 3D annotation tracks the motion of the attachment point.

10. A method to display multiple dynamic 3D annotations associated with various objects displayed in a 3D scene, comprising:
    providing a computer system that includes a display device;
    establishing a view location and direction;
    orienting each dynamic 3D annotation substantially perpendicular to the view direction;
    orienting each dynamic 3D annotation substantially horizontal relative to the 3D scene; positioning each dynamic 2D annotation relative to its respective attachment point on or near one of the objects;
    extending an attachment handle, for each dynamic 3D annotation, between the dynamic 3D annotation and its respective attachment point;
    displaying the dynamic 3D annotations and their respective attachment handles in the 3D scene on the display device; and
    dynamically recalculating the size of each dynamic 3D annotation to keep its projection displayed by the display device constant as the view location changes.

11. The method of claim 10, wherein each dynamic 3D annotation includes an information area.

12. The method of claim 11, wherein the information area presents information in the form of text, images, animations, graphs, hyperlinks, and/or tables.

13. The method of claim 10, wherein the display device is a monitor, a printer, or a plotter.

14. The method of claim 10, further comprising positioning the dynamic 3D annotations to eliminate any overlap between the dynamic 3D annotations and any of the displayed objects.

15. The method of claim 14, further comprising positioning the dynamic 3D annotations to eliminate any overlap among any of the dynamic 3D annotations displayed in the 3D scene.

16. The method of claim 10, further comprising sizing each dynamic 3D annotation based on its distance from the viewing location.

17. The method of claim 10, further comprising ordering the rendering of the display objects to draw the dynamic 3D annotations on top.

18. The method of claim 10, wherein each dynamic 3D annotation tracks the motion of its respective attachment point.

* * * * *